C. E. ANDREWS 1,666,251

TEMPERATURE REGULATING SYSTEM

Filed Feb. 19, 1927

INVENTOR.
CHESTER E. ANDREWS
BY Newell & Spencer
ATTORNEYS.

April 17, 1928.

C. E. ANDREWS 1,666,251

TEMPERATURE REGULATING SYSTEM

Filed Feb. 19, 1927    5 Sheets-Sheet 4

Fig. 4.

INVENTOR
CHESTER E. ANDREWS
BY Newell & Spencer
ATTORNEYS

Patented Apr. 17, 1928.

1,666,251

UNITED STATES PATENT OFFICE.

CHESTER E. ANDREWS, OF CARNEGIE, PENNSYLVANIA, ASSIGNOR TO THE SELDEN COMPANY, OF PITTSBURGH, PENNSYLVANIA, A CORPORATION OF DELAWARE.

TEMPERATURE-REGULATING SYSTEM.

Application filed February 19, 1927. Serial No. 169,572.

This invention relates to methods of regulating temperature by the use of boiling liquids and more particularly relates to an improved method of controlling intermittently or continuously the boiling point of high boiling mixtures.

In the past the use of boiling liquids for the control of temperatures, particularly of chemical reactions, has become exceedingly important, especially in connection with certain vapor phase catalytic reactions, such as the oxidation of aromatic compounds to intermediate oxidation products, pyrogenetic processes, such as cracking of oils; dehydrogenation, such as production of cyclohexanone from cyclohexanol; dehydration; polymerization, and condensation, such as production of artificial resins like cumarone and other reactions which require an exact temperature control. Reactions can be carried out at atmospheric, diminished or elevated pressure. High boiling liquids, such as mercury, have been used to regulate the temperature in converters for catalytic reactions and for similar purposes but labor under the disadvantage that when variations in temperature are required it is necessary to vary the pressures of the vapors on the boiling liquid. This introduces many complications and requires a considerable additional cost in equipment, as it is not only necessary to add compressors but the various connections of the system have to be tight under relatively high pressures which in turn requires a more expensive design and increases the possibility of leaks.

In the prior United States patent to Frank A. Canon and myself, No. 1,614,185, dated January 11, 1927, reissued as Reissue No. 16,824, December 20, 1927 and in the co-pending applications of Frank A. Canon and myself, Serial Nos. 569,734, 567,740, 565,741, 159,677 and 67,685, we have described the control of catalytic reactions by the use of alloys such as for example, alloys of mercury, the boiling point under ordinary atmospheric pressure being varied by the relative proportions of the components of the alloy. Thus, for example, in the case of a typical alloy such as that of mercury and cadmium, which has been described in the applications above referred to, the boiling point increases with increased percentages of cadmium and in order to provide for different boiling temperatures it is necessary to change these proportions. While the process in my joint prior applications and patent represents a distinct and important improvement over the use of pressure in connection with mercury for the control of the boiling temperature in that the expensive pressure equipment and pressure-tight joints are eliminated, it is subject to the disadvantage that for certain purposes where the temperature may require variation from day to day, it is a somewhat difficult matter to change the proportion of the various components of the alloy in order to bring about the desired change in boiling point.

The present invention combines all of the advantages of the process of my joint prior applications and patent and in addition presents the important advantage that the proportions of the components in the boiling liquid can be continuously varied within wide limits during operation of the system. It is therefore not necessary at any time to shut down operation in order to change the composition of the boiling alloy bath and predetermined temperature variations can be obtained continuously and simply. The present invention therefore combines, with the advantages of my joint prior applications and patent, the only advantage which the pressure system possesses, namely, the possibility of continuous variation of the boiling point without shutting down or interrupting operation. This advantage of the pressure system is obtained without any of the disadvantages of pressure.

The invention is particularly applicable to high boiling mixtures such as metal alloys but it is also applicable to other mixtures, such as, for example, solutions of solid materials.

According to the present invention the composition of the bath is varied by removing or adding components to the condensed vapors of the boiling bath which, in ordinary installations are condensed in a reflux condenser and returned to the bath. The invention will be described in connection with metal alloys for which it is particularly suitable but it should be understood that it is also applicable to solutions of certain solids in liquids which, for purpose of the present invention, possess many of the operating characteristics of alloys or other liquid mixtures in which one of the components is normally a solid.

For example, when a mercury cadmium alloy containing 75% mercury and 25% cadmium and having a boiling point of about 400° C. is used in a catalytic converter, the vapors which are given off when the mixture boils and which are normally condensed in a reflux condenser and returned have a composition in which the low boiling mercury is present in much higher percentage than in the boiling bath itself. If therefore, it is desired to increase the temperature at which the bath boils, this may be effected by drawing off some of the condensed vapors from the reflux condenser. Since the condensed vapors thus removed are much richer in mercury than the bath itself, the relative amount of mercury therein decreases and correspondingly the boiling point increases. If it is then again desired to lower the boiling point this can be effected by introducing additional amounts of liquid mercury into the reflux condenser or into the bath itself. By this simple means a control can be effected throughout a moderate range of concentration. Where higher percentages of cadmium are required than can be readily obtained by this method, a cadmium mercury alloy richer than that present in the bath can be introduced into the reflux condenser and thence into the bath, thus still further increasing the percentage of cadmium. Cadmium can also be removed from the bath by withdrawing the condensate from the reflux condenser, which condensate contains a small amount of cadmium, and continuously replacing it with pure mercury. In general, I find that it is simpler and easier to effect the major portion of the control by the addition or subtraction of mercury, as the latter is easier to handle since alloys high in cadmium possess relatively high melting points and therefore involve somewhat greater difficulties in handling. The invention may, of course, be applied to boiling mixtures in which a normally solid material is dissolved in a liquid, for example, aqueous solution of readily soluble salts. In such cases, the boiling water vapors can be partially drawn off or additional water can be added to vary the boiling point continuously during operation.

The preferred embodiments of the invention will be described in greater detail in connection with the accompanying drawings, in which various catalytic converters are illustrated. It should be, of course, understood that these are illustrations of only one field in which the present invention is of predominant importance and it can be used in any other field where an accurate regulation of temperature is necessary or desirable and the invention is in no sense to be considered as limited to the apparatus described in the drawings or to the precise purposes for which the heat-regulating bath is therein utilized.

Figure 1:
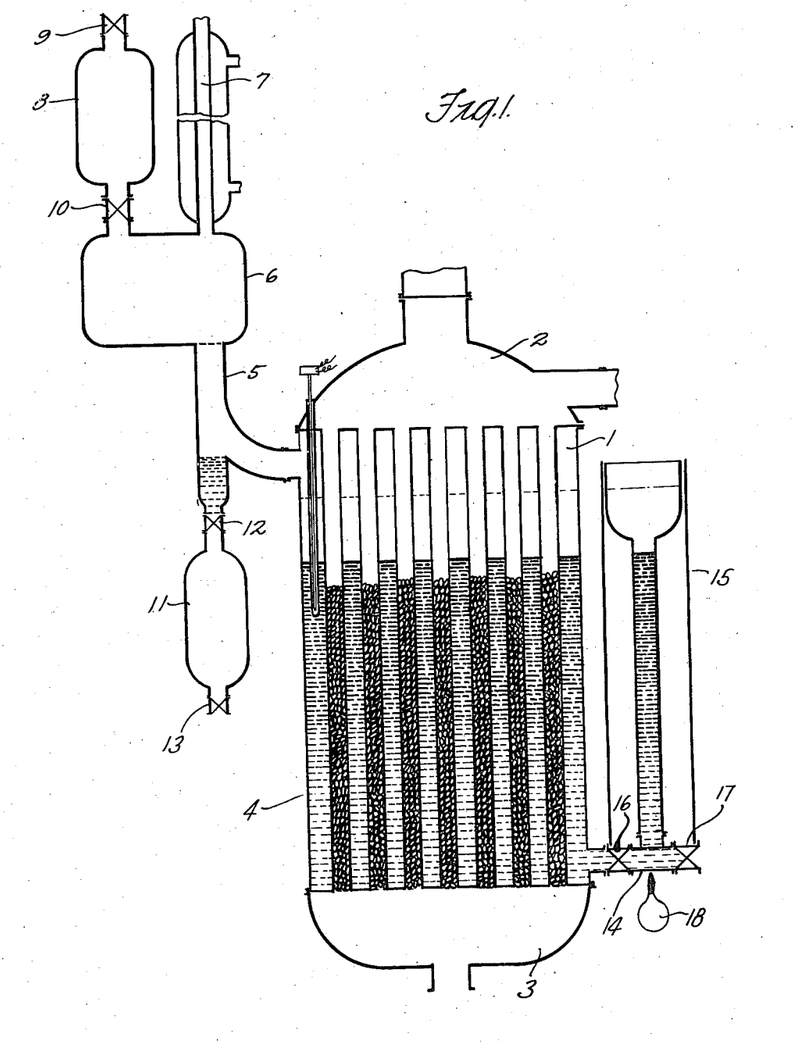
Figure 1 is a cross section through a converter of common type provided with means for removing or adding mercury from the condensed vapors.

In the embodiment shown in Figure 1, a tubular converter consisting in shell 1, top piece 2, bottom piece 3 and catalyst tubes 4, is provided with a bath which may, for example, be composed of a cadmium and mercury alloy. The level of the bath is considerably above the catalyst in the tubes and a vapor space is provided which is connected through the pipe 5 to the chamber 6 which is in communication with a reflux condenser 7 and a mercury storage tank 8 provided with the valves 9 and 10. A second mercury storage tank 11 is connected to the lowest point of the pipe provided with a valve 12. The tank 11 is also further provided with a drain valve 13. A pipe 14 extends from the bottom of the shell 1 and is provided with the equalizing leg 15. A valve 16 is interposed between the converter and the leg 15 and a drain pipe 17 is further provided. The material in the leg can be kept molten by the small burner 18.

In operation, after the bath has been heated up by means of the burner 18 the gases for the catalytic reaction which may, for example, consist in vapors of naphthalene and air pass in through the top piece 2, down through the tubes 4 and out through the bottom piece 3, reacting in the presence of the catalyst to form phthalic anhydride. The bath boils and vapors rich in mercury flow up through the pipe 5 and chamber 6 into the reflux condenser 7, where they are condensed, and flow back into the converter. The valves 10 and 12 are closed. If it is desirable for example, to raise the boiling temperature by decreasing the relative proportion of mercury in the bath the valve 12 can be opened and a portion of the condensed vapors permitted to flow into the tank 11 until the percentage of mercury in the converter has fallen to the desired point and correspondingly the boiling point is raised. If thereafter it is desired to again lower the boiling point of the bath, mercury from the tank 8 can be caused to flow into the chamber 6 by opening the valve 10 and thence through the pipe 5, back to the bath, again increasing the proportion of mercury therein.

The range of temperature control depends, of course, upon the amount by which the level of the bath can be lowered, i. e., the amount of mercury that can be removed. This is shown in the drawings by the light dotted lines indicating the highest level of the mercury. The lowest level of the bath which should usually be sufficient to cover the catalyst tubes to a height at least as great as that occupied by the catalyst, is shown by dotted lines in dark shading. When the converter is charged in the beginning, of course, mercury and solid cadmium may be filled into the leg 15 and melted by means of the burner 18.

Figure 2:
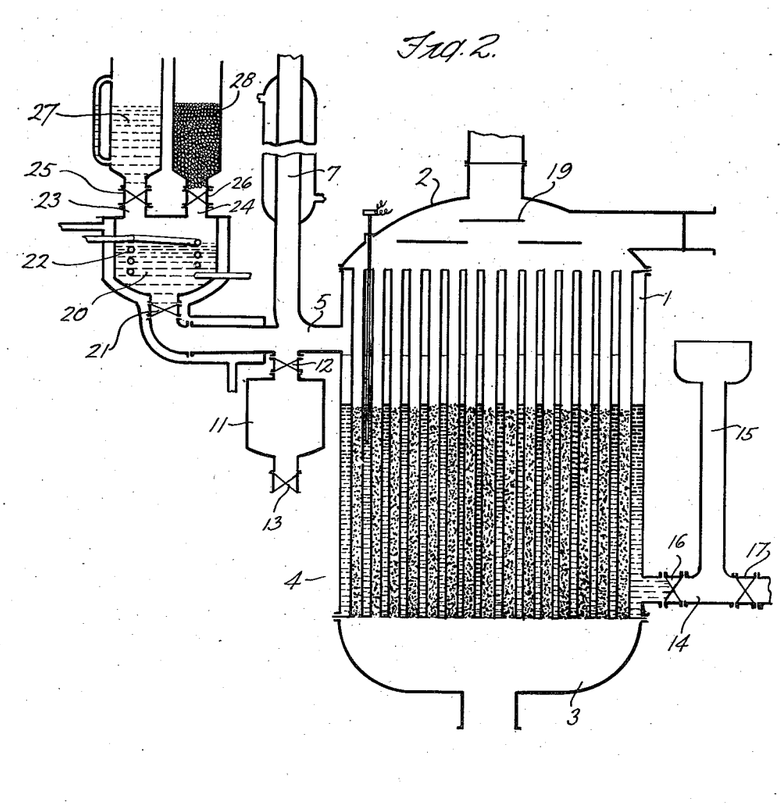
Figure 2 illustrates a similar sectional view of a converter provided with means for introducing mercury or cadmium into the bath at will.

In the installation shown in Figure 2, similar portions of the converter are given similar numerals. The converter is of substantially the same type except that baffles 19 are provided to effect a more satisfactory mixture of the reaction gases, and the burner on the expansion leg has been omitted. The reflux condenser 7 instead of passing into a chamber 6, directly enters the pipe 5 which is connected at its lowest point to mercury storage tank 11, as in the construction shown in Figure 1. The pipe 5 beyond the connection with the reflux condenser 7 passes into a jacketed chamber 20 provided with a shut-off valve 21 and a heating coil 22. In the top of this chamber are mounted two pipes 23 and 24 provided with valves 25 and 26 and connecting with a mercury storage tank 27 and a cadmium storage tank 28. Cadmium and mercury in any desired proportion can be caused to flow into the chamber 20 and can be sufficiently heated by the jacket and heating coil so that alloy thus formed is liquid. By this means an alloy which may be rich in cadmium or rich in mercury can be added at will to the bath in the converter where it is desired to increase the concentration of cadmium beyond that readily obtainable by drawing off a proportion of the mercury vapors condensed.

Figure 3:
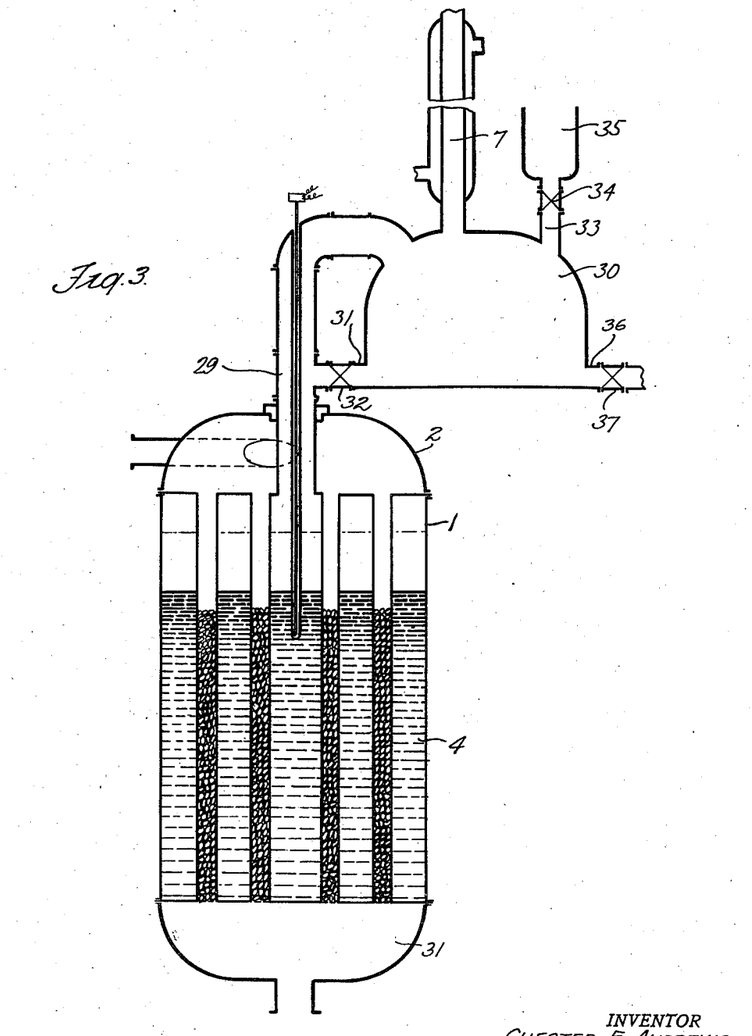
Figure 3 illustrates a similar type of converter provided with means for introducing cadmium alloys of relatively high melting point into the bath during operation.

In Figure 3 the converter is of the same general type as that shown in Figures 1 and 2, but is not provided with any draw-off leg 15. The vapors from the bath pass up through a central pipe 29 which is exposed to the in-coming cold reacting gases and a certain amount of condensation therefore takes place directly in this pipe. The remaining vapors pass into the top of a chamber 30 which is connected at its lower end to the pipe 29 through a pipe 31 provided with a valve 32 which is normally open. The reflux condenser 7 is mounted into the top of this chamber as is a pipe 33 provided with a valve 34 and connecting with a cadmium hopper 35. A draw-off pipe 36 is also provided at the bottom of the chamber 30 and is controlled by a valve 37. In operation the vapors from the boiling bath pass up through the pipe 29 and enter the chamber 30 either through this pipe or through the pipe 31, being condensed either in the chamber or in the reflux condenser 7 and flow back through the pipe 31. If it is desired to raise the temperature of the bath the valve 32 is closed and the valve 37 is opened and mercury content in the converter is reduced to the desired extent. If the concentration of cadmium is to be further increased the valve 37 is closed, and the valves 32 and 34 are opened. Cadmium then flows into the chamber 30, is then brought in contact with the hot condensed mercury from the reflux condenser 7, and is gradually melted or dissolved by the latter to form a molten alloy which flows back through the pipe 31. This obviates the necessity of a special heating means for keeping the alloy molten, as is shown in Figure 2 and for some purposes is a more advantageous construction.

Figure 4:
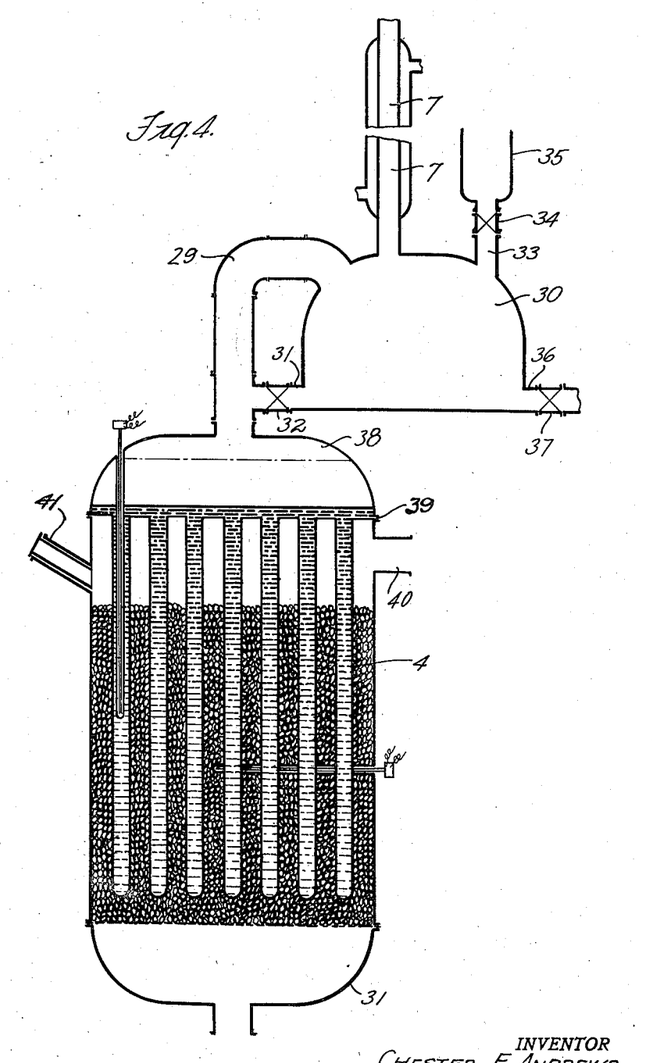
Figure 4 illustrates a converter of somewhat different design having a similar provision for introducing concentrated cadmium alloys.

Figure 4 shows a somewhat different type of converter in which the bath is in tubes 4 extending into the catalyst which surrounds them. The upper portion of the converter forms a bath chamber 38 separated from the catalyst space by the partition 39. Reaction gases enter below this partition through the pipe 40 and serve to cool the bath liquid in the tubes 4. The reacting gases are thereby heated up as in the foregoing figures, where they come in heat-exchanging relation with the vapors surrounding the upper portion of the catalyst tubes. The vapors from the boiling bath pass up through the pipe 29 into a chamber 30 which is of the same design as that shown in Figure 3, similar parts bearing similar numerals. The operation of the converter is, of course, similar to that of Figure 3 and possesses the same advantages. Catalyst may be introduced into the converter through the flanged filling pipe 41.

Figures 5, 6:
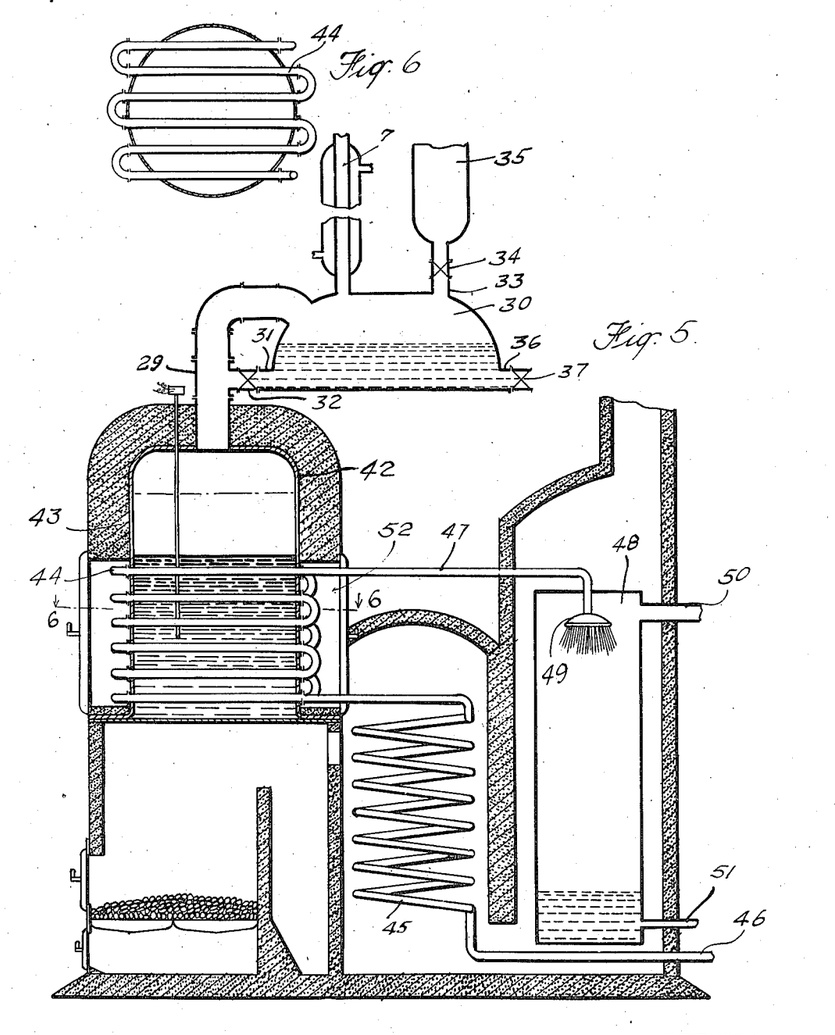
Figure 5 illustrates a liquid heater for the cracking of oils and similar purposes.
Figure 6 is a horizontal section taken along the line 6—6.

Figures 5 and 6 illustrate a liquid heater for cracking oils or the like. The heater consists in a bath container 42 containing an alloy bath 43 in which a continuous pipe 44 is arranged in a zagzag form in several layers. This pipe connects with a preheater coil 45 and a pipe line 46 leading from a reservoir of oil to be cracked, or similar products. From the top of the heating pipe 44 a pipe 47 extends into a heated vaporizing chamber 48 terminating in a spray 49. The vapor pipe 50 permits the escape of vapors from the chamber 48 and liquid from the bottom of this chamber can be withdrawn through a pipe 51. The whole still is heated by means of a coal fire or any other suitable method, the greatest temperature being directed against the bottom of the bath chamber 42. The partly cooled heating gases then pass in series over the preheating coil 45 and around the vaporizing chamber 48.

The chamber 42 is provided with a vapor space which connects to a reflux system which is substantially the same as that shown in Figure 4, similar parts bearing the same reference numerals as in the above-mentioned figure. The temperature in the bath 43 is maintained constant by the boiling of the bath and refluxing of the vapors. The composition of the bath can be varied as described in connection with Figures 3 and 4 by the addition of more or less volatile components.

When the still is to be operated as an oil cracking still the oil to be cracked is introduced through the pipe 46 into the preheating coil 45 where it is heated up to the desired temperature and then passes through the heater pipe 44 immersed in the bath where it can be cracked at a definitely predetermined temperature which is automatically maintained constant by the boiling bath. The heated and partially cracked or vaporized oil then passes out through the pipe 47 and is sprayed through the head 49 into the chamber 48 in which the pressure may be the same as in the cracking coil but usually is considerably less. Part of the oil may vaporize, the vapors being drawn off through the pipe 50 and the unvaporized oil being removed through the pipe 51. Obviously, of course, the chamber can be connected to suitable fractionating heads in order to effect any desired fractionation of the cracked products.

The still shown in Figures 5 and 6 permits an extraordinarily uniform high cracking temperature to be maintained in the cracking pipes 44. This is of great advantage where an accurate control of the cracking temperature is necessary to bring about the best results. There is little, if any, tendency to carbonize in the pipes, as they are not exposed to the direct flame and are kept at a uniform temperature which has been determined in advance for the best results. The installation, protected as it is against direct flame, also is less liable to breakage as it is not subjected to extremes of temperature which would tend to warp the pipe and set up undesirable strains.

For some purposes the heat on the bottom of the chamber 42 may be sufficient but where a greater heat is desirable this can be effected by passing some of the heating gases around the chamber 42. A space 52 is provided for this purpose.

The invention has been illustrated in the drawings in connection with converters for various catalytic reactions and a liquid heater. These converters have been shown diagrammatically and many of the accessories have been omitted as the precise structural details of the converters, of course, form no part of the present invention which, on the contrary, is applicable to a wide number of different designs of converters or other devices, in which an accurate regulation of temperature is required. The proper structural design of the installations in every case will be chosen by a competent engineer.

The invention has been described particularly in connection with a mercury and cadmium alloy for use in cooling converters for the oxidation of aromatic compounds, such as naphthalene to phthalic anhydride, anthracene to anthraquinone and the like. Other metal alloys, of course, may be used and in many cases are advantageous. The particular alloy to be chosen will, of course, depend on the temperature which is required. In some cases binary alloys are preferable and in other cases ternary alloys or alloys containing a still larger number of components may be preferable. A few representative alloys are shown in the accompanying table and illustrate the possibilities of utilizing the present invention to readily obtain wide variations in temperature.

Table 1.

| Compounds of alloy in % by wgt. | | | | B. P. | M. P. | Sp. gr. | Heat conductivity |
|---|---|---|---|---|---|---|---|
| Cd | Sn | Pb | Hg | | | | |
|  |  |  | 100 | 357 | −38.8 | 13.595 | .0189 |
|  |  | 100 |  | 1525 | 327.4 | 11.337 | .0830 |
|  | 100 |  |  | 1450 | 232.0 | 7.298 | .1570 |
| 100 |  |  |  | 766 | 320.9 | 8.642 | .2216 |
| 12 |  |  | 88 | 370 | 20.0 | 13.010 |  |
| 21.9 |  |  | 78.1 |  | 97.0 | 12.490 |  |
| 25 |  |  | 75 | 400 | 100.0 | 12.360 |  |
| 30 |  |  | 70 | 410 |  | 12.090 |  |
| 33.5 |  |  | 66.5 | 415 |  | 11.940 |  |
| 35 |  |  | 65 | 420 |  | 11.870 |  |
| 40 |  |  | 60 | 430 | 151.0 | 11.600 |  |
| 43 |  |  | 57 | 440 |  | 11.500 |  |
| 60 |  |  | 40 | 492 |  | 10.620 |  |
| 10 | 10 |  | 80 | 370 | 20.0 | 12.740 |  |
| 20 | 20 |  | 60 | 383 | 60.0 | 11.870 |  |
| 25 | 25 |  | 50 |  | 100.0 | 11.460 |  |
| 30 | 30 |  | 40 | 405 | 120.0 | 11.030 |  |
| 40 | 40 |  | 20 | 450 | 160.0 | 10.170 |  |
| 10 |  |  | 90 | 368 |  | 13.010 |  |
| 20 |  |  | 80 | 370 |  | 12.360 |  |
| 40 |  |  | 60 | 380 | 120.0 | 11.070 |  |
| 60 |  |  | 40 | 410 | 155.0 | 9.810 |  |
|  | 10 |  | 90 | 370 |  | 13.330 |  |
|  | 20 |  | 80 | 373 |  | 13.140 |  |
|  | 40 |  | 60 | 380 |  | 12.680 |  |
|  | 50 |  | 50 | 385 |  | 12.460 |  |

While for many purposes metal alloy baths are the most satisfactory temperature-regulating systems for use at relatively high temperatures, certain solutions of solid materials in water or other liquids are important. The following table shows the boiling point of certain representative solutions and the control, of course, can be effected as described in connection with metal alloys, the solid material being handled in the same manner as the solid cadmium and the liquid, of course, taking the place of the mercury.

Table 2.

| NH₄NO₃ | | KOH | | CaCl₂ | |
|---|---|---|---|---|---|
| B. P. | Parts per 100 parts H₂O | B. P. | Parts per 100 parts H₂O | B. P. | Parts per 100 parts H₂O |
| ° | | ° | | ° | |
| 101 | 10 | 105 | 20.5 | 101 | 6.0 |
| 103 | 30 | 140 | 92.5 | 110 | 41.5 |
| 110 | 108 | 180 | 152.6 | 130 | 101.0 |
| 120 | 248 | 210 | 202.0 | 150 | 178.0 |
| 160 | 1370 | 230 | 240.9 | 170 | 268.0 |
| 200 | 4099 | 300 | 444.4 | 178 | 305.0 |
| 230 | 16950 | 340 | 623.6 | | |

| LiCl | | KC₂H₃O₂ | |
|---|---|---|---|
| B. P. | Parts per 100 parts H₂O | B. P. | Parts per 100 parts H₂O |
| ° | | ° | |
| 101 | 3.5 | 101 | 6.0 |
| 110 | 26.0 | 110 | 63.5 |
| 140 | 73.3 | 130 | 212.0 |
| 160 | 122.5 | 150 | 444.5 |
| 168 | 151.0 | 161 | 626.0 |

In general, the present invention makes it readily possible to continuously control the relative composition of mixtures or solutions in which one of the components may be liquid at ordinary temperatures, whereas the other is solid at ordinary temperatures or is relatively non-volatile. The invention can be applied in many fields and is not to be considered as limited to the few representative embodiments which have been described.

What is claimed as new is—

1. A method of varying the boiling point of two-phase, liquid-vapor temperature-regulating systems in which the liquid phase contains a plurality of components at least one of which is normally solid and which system includes reflux condensing means for the vapor phase, which comprises varying the composition of the reflux condensate before returning the latter to the main body of the liquid phase of the system.

2. A method of raising the boiling point of two-phase, liquid-vapor temperature-regulating systems in which the liquid phase contains a plurality of components at least one of the components being solid at ordinary temperatures and relatively non-volatile and which system includes reflux condensing means for the vapor phase, which comprises abstracting a portion of said reflux condensate which is richer in the volatile components of the liquid phase of the system than is the main body thereof.

3. A method of regulating the boiling point of a two-phase, liquid-vapor temperature-regulating system, in which liquid phase consists in a metal alloy at least one component of which is a solid at ordinary temperatures and relatively non-volatile, and which system includes reflux means for condensing the vapor phase, which comprises varying the composition of said reflux condensate before the latter is returned to the main body of liquid in the system.

4. A method of raising the boiling point of a two-phase, liquid-vapor temperature-regulating system employing a metal alloy in its liquid phase, at least one component of which is a solid at ordinary temperatures and is relatively less volatile than at least one of the other components and which system is provided with reflux condensing means for the vapor phase, which comprises abstracting at least part of said reflux condensate which is relatively richer in the volatile components of the alloy, whereby the percentage of relatively non-volatile components of the alloy in the main liquid portion of the system is increased.

5. A method of varying the boiling point of two-phase, liquid-vapor temperature-regulating systems, utilizing mercury alloys in their liquid phase and provided with reflux condensing means for the vapor phase, which comprises varying the percentage composition of the reflux condensate before returning the latter to the main body of the liquid in the system.

6. A method of raising the boiling point of a two-phase, liquid-vapor temperature-regulating system, utilizing a mercury alloy in the liquid phase and provided with reflux means for condensing the vapors, which comprises abstracting at least a portion of the reflux condensate which is relatively richer in mercury than in the other components of the bath, whereby the relative percentage of these other components is increased.

7. A method of controlling the boiling point of a two-phase, liquid-vapor temperature-regulating system, utilizing an alloy of mercury and cadmium and provided with reflux means for condensing the vapor phase, which comprises varying the composition of the reflux condensate.

8. A method of raising the boiling point of a two-phase, liquid-vapor temperature-regulating system, utilizing an alloy of mercury and cadmium in its liquid phase and provided with reflux condensing means, which comprises abstracting at least part of the reflux condensate which is relatively richer in mercury than the main body of liquid in the system, whereby the relative percentage of cadmium in the latter is increased.

9. A two-phase, liquid-vapor temperature-regulating device comprising in combination an object to be maintained at constant temperature, a container for a liquid bath so positioned with respect to the object that the bath is in heat-exchanging relation therewith, a vapor space in said liquid container, a reflux condensing means associated with said vapor space, said reflux condensing means including a chamber, means for introducing solid material into said chamber, and means for causing part at least of the vapors entering the reflux condensing system or condensate formed therein to impinge on said solid material.

10. A catalytic converter comprising a catalyst chamber, an enclosed bath in heat-exchanging relation with said chamber, said enclosed bath being contained in a bath-containing space which is provided with a vapor space, a reflux condensing system connected to said vapor space, means for removing reflux condensate from said system, a chamber associated with said system, means for introducing solid material into said chamber, and means for causing vapors or condensate in said system to contact with said solid material.

11. A catalytic converter, an enclosed cooling bath in heat-exchanging relation therewith, said cooling bath being contained in a space which provides for a vapor space, a reflux condensing system connected to said vapor space, means for removing condensate from said reflux condensing system, a chamber in said system, means for draining liquid material from said chamber into the reflux condensing system, and means for heating the material in said chamber and for maintaining it at an elevated temperature.

Signed at Pittsburgh, Pennsylvania, this 17th day of February, 1927.

CHESTER E. ANDREWS.